United States Patent
Hattori

(10) Patent No.: US 6,791,369 B1
(45) Date of Patent: Sep. 14, 2004

(54) CLOCK PRESENCE DETECTOR COMPARING DIFFERENTIAL CLOCK TO COMMON-MODE VOLTAGE

(75) Inventor: Hide Hattori, Palo Alto, CA (US)

(73) Assignee: Pericom Semiconductor Corp., San Jose, CA (US)

( * ) Notice: Subject to any disclaimer, the term of this patent is extended or adjusted under 35 U.S.C. 154(b) by 0 days.

(21) Appl. No.: 10/604,284

(22) Filed: Jul. 8, 2003

Related U.S. Application Data

(63) Continuation-in-part of application No. 10/064,074, filed on Jun. 7, 2002, now Pat. No. 6,593,801.

(51) Int. Cl.[7] .................................. H03F 3/45
(52) U.S. Cl. ..................... 327/52; 327/53; 327/63
(58) Field of Search ..................... 327/51, 52, 53, 327/65, 66, 70, 560, 561, 562, 563; 323/315, 316

(56) References Cited

U.S. PATENT DOCUMENTS

| | | | |
|---|---|---|---|
| 4,117,348 A | 9/1978 | Newman | 327/20 |
| 4,230,958 A | 10/1980 | Boll et al. | 327/18 |
| 4,380,080 A | 4/1983 | Rattlingourd | 375/289 |
| 4,672,325 A | 6/1987 | Murai | 327/135 |
| 4,736,117 A * | 4/1988 | Wieser | 327/546 |
| 5,343,164 A * | 8/1994 | Holmdahl | 330/253 |
| 5,894,284 A | 4/1999 | Garrity et al. | 341/172 |
| 5,986,497 A | 11/1999 | Tsugai | 327/554 |
| 6,016,566 A | 1/2000 | Yoshida | 714/736 |
| 6,281,699 B1 | 8/2001 | Bishop | 324/765 |
| 6,333,646 B1 | 12/2001 | Tsuzuki | 327/47 |
| 6,549,072 B1 * | 4/2003 | Vernon | 330/252 |
| 6,573,779 B2 * | 6/2003 | Sidiropoulos et al. | 327/345 |

* cited by examiner

Primary Examiner—Timothy P. Callahan
Assistant Examiner—An T. Luu
(74) Attorney, Agent, or Firm—Stuart T. Auvinen

(57) ABSTRACT

Presence or absence of a differential clock is detected. The voltage of each differential clock line is compared to the common-mode voltage and integrated over time by a capacitor. The capacitor is discharged during the portions of the clock cycle that the differential line is over the common-mode voltage. If the clock stops pulsing the capacitor is charged by a current source to activate a clock-loss signal. The clock-loss detector is ideal for high-frequency operation since each differential clock line is applied to only one transistor gate. The common-mode voltage generates a bias voltage for a differential amplifier that receives the true and complement differential clock lines. Diodes prevent capacitor charging by reverse current flow from the differential amplifier when the clock is inactive. The averaged peak voltage or envelope of the differential input signals is detected.

19 Claims, 6 Drawing Sheets

40

CLOCK PRESENCE DETECTOR COMPARING DIFFERENTIAL CLOCK TO COMMON-MODE VOLTAGE

CROSS REFERENCE TO RELATED APPLICATIONS

This application is a continuation-in-part of the co-pending application for Power Down Mode Signaled by Differential Transmitter's High-Z State Detected by Receiver Sensing Same Voltage on Differential Lines, U.S. Pat. No. 6,593,801, U.S. Ser. No. 10/064,074, filed Jun. 7, 2002.

BACKGROUND OF INVENTION

This invention relates to clock detection, and more particularly for methods to detecting clock pulsing by the averaged peak voltage difference, or envelope, of a differential clock.

A technique for increasing the signaling speed of integrated circuits (IC's) is to use differential rather than single-ended signals. A differential pair of signals has two physical lines that move in opposite directions when changing state: one differential signal line is driven to a higher voltage while the other differential line is driven to a lower voltage. At steady-state, one of the differential signal lines is in a high state while the other differential line is in a low state. The difference in voltage between the high and low states can be only a few hundred milli-volts, minimizing voltage swing, capacitive charging delays, and overall signal propagation delay.

Many modern electronic systems are portable, running on limited battery power. Other systems must limit power consumption to reduce cooling requirements or electric power costs. Often some parts of a system are not in continuous use and can be powered down when idle.

FIG. 1 highlights power-down of differential signaling between two chips. Transmitter chip 14 contains differential transmitter 10, which drives differential output lines V+, V− to opposite states. Differential receiver 12 in receiver chip 16 senses a small voltage difference between differential input lines V+, V− and outputs a single signal to logic inside receiver chip 16. This signal can be a clock signal generated by transmitter chip 14.

Transmitter chip 14 may contain control logic that determines when the functions performed by receiver chip 16 are no longer needed. Transmitter chip 14 activates power-down signal PWR-DN which connects to an enable input of receiver chip 16. Activating PWR-DN causes receiver chip 16 to enter a low-power state.

Sometimes the connection between chips 14, 16 can be broken, such as when a cable is unplugged. FIG. 2 shows a fail-safe circuit that blocks data in a receiver when a differential connection is broken. The differential lines driven by differential driver 10 in transmitter chip 14 are disconnected from receiver 12, perhaps by a disconnected cable. Pull-up resistors 24, 26 near receiver chip 16' pull the differential inputs high when the cable is disconnected. NAND gate 22 detects when both of the differential inputs are in the high state, which does not occur during normal operation.

NAND gate 22 drives the fail-safe signal FSB low when the H-H condition is detected, causing AND gate 20 to output a low, regardless of the data condition sensed by receiver 12. Thus downstream logic in chip 16' is protected from indeterminate data and metastability by the fail-safe circuit.

Often the number of available pins on an integrated circuit chip is limited. Pin functions can be combined to save pins, such as by using an encoded clock using Manchester Encoding, or by using illegal conditions (states of one or more pins) to signal a seldom-used mode.

FIG. 3 shows a power-down mode encoded by an illegal high-high state of differential lines. Transmitter chip 14' generates an internal power-down signal PDN when control logic determines that receiver chip 16 should power down. This PDN signal causes modified differential transmitter 10' to ignore its data input and instead drive both differential outputs to a high state. Normally one or the other differential line is driven low, so the high-high condition is abnormal or illegal.

NAND gate 22 in receiver chip 16" detects when both differential lines are in the high state, and activates the internal power-down signal PDNB by driving it low. This internal power-down signal then powers down logic in receiver chip 16". This may include logic downstream of receiver 12, so that an indeterminate state of the output from receiver 12 does not propagate.

Rather than signaling the power-down condition using the high-high state, the low-low state can be used. However, logic in receiver chip 16" must be modified to detect this low-low condition rather than the high-high condition. A disadvantage of this technique is that transmitter 10 in transmitter chip 14 must be modified to generate the high-high or low-low condition. Both chips 14, 16 must be modified and designed to operate with one another. A standard differential transmitter cannot be used, since a standard differential transmitter does not generate the illegal H-H or L-L state.

Such a modification of the differential transmitter may not always be possible, such as when the differential transmitter is on a personal computer (PC) driving a clock to a memory module. While the differential receiver on the memory module could be modified as new versions of memory modules are designed, the differential transmitter cannot be modified for pre-installed computers.

FIG. 4A shows a standard differential transmitter with an enable. Standard transmitter chip 28 includes differential transmitter 30 that drives a pair of differential lines to receiver chip 16". NAND gate 22 can detect the high-high condition and activate a power-down mode in receiver chip 16". However, differential transmitter 30 cannot drive both differential lines high.

When the enable input to differential transmitter 30 is deactivated, differential transmitter 30 stops driving both differential lines and enters a high-impedance (high-Z) state. This high-Z state is not the same as a high state.

FIG. 4B is a waveform of a standard differential transmitter entering the high-Z state. When enable ENA is high, differential transmitter 30 drives differential lines V+, V− opposite states as the data input to differential transmitter 30 toggles. When ENA goes low, differential transmitter 30 is disabled and stops driving the differential lines. The differential lines then float.

If the differential lines were completely isolated, the voltage would remain in the prior state. However, capacitive coupling from other signals and leakage can upset the voltages on the differential lines, causing them to drift. Leakage between the two differential lines can cause the voltages to equalize over time. Any terminating resistors can also alter the voltages on the differential lines.

Since NAND gate 22 in receiver chip 16" only detects dual high voltages, the floating differential lines do not necessarily trigger the power-down state. Indeed, as other signals capacitivly couple into the differential lines, receiver chip 16" can pass in and out of the power-down state, causing logical problems. Thus the high-impedance state is not as useful as the dual-high state for signaling power-down, causing a non-standard differential drive to be needed.

Various circuit to detect the presence or absence of a clock signal are known. While such clock detectors are useful, a clock detector that detects a differential clock is desirable. A differential-clock detector circuit is desirable.

DETAILED DESCRIPTION

The present invention relates to an improvement in clock detectors. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventor has realized that clocks can be detected by examining the averaged peak voltage or "envelope" of the clock signal. Instead of detecting the edge of the signal, or duty cycle, the detector circuit achieves higher frequency performance by detecting the peak voltage and averaging it out over a certain time period. The inventor has further realized that the approximate or averaged peak voltage can be examined by comparing one or both of the differential lines to the common mode voltage of the differential clock.

When a shunt resistor is added between the differential clock lines, the differential lines float to a same voltage when the differential transmitter enters the high-impedance state. The final voltage of the differential lines can be high, low, or intermediate, and can change with time due to capacitive coupling and leakage. However, the voltages of the two differential lines should be mostly the same due to the shunt resistor. This same voltage is the common-mode voltage.

When the clock is pulsing, each differential line spends time above and below the common-mode voltage. When the clock stops pulsing and enters the high-impedance state, both differential clock lines drift to the common-mode voltage. The circuit detects the maximum voltage difference between the two differential lines, and averages them out over time. The voltage difference between the two differential lines often is lower when the clock stops pulsing.

Figure 1:
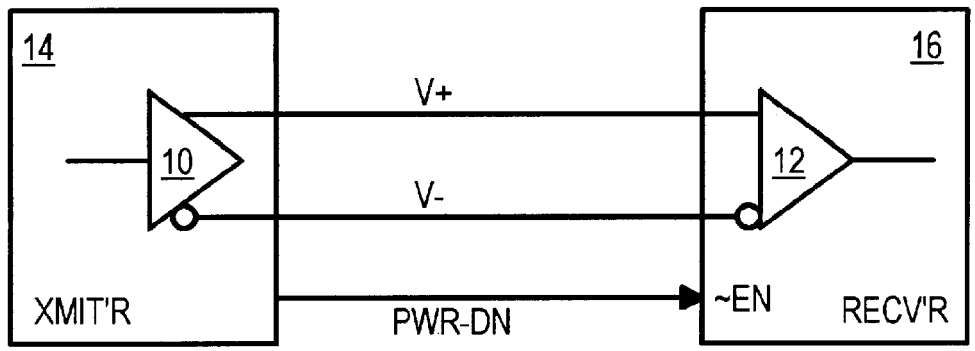
FIG. 1 highlights power-down of differential signaling between two chips.
Figure 2:
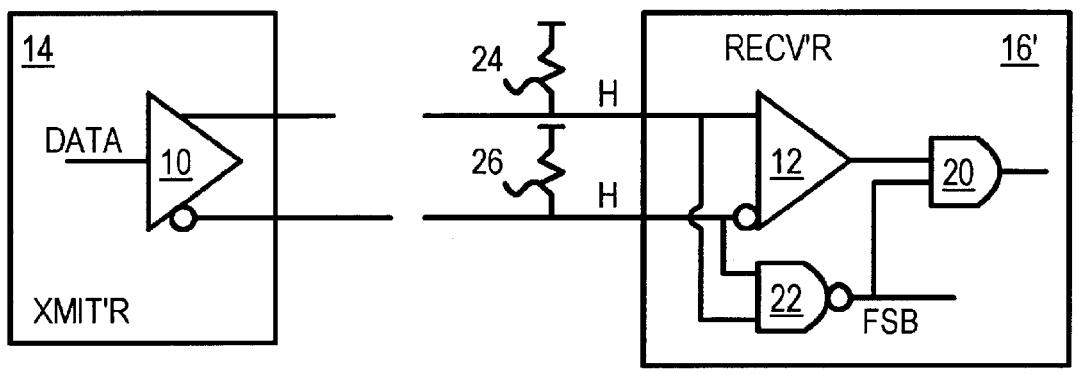
FIG. 2 shows a fail-safe circuit that blocks data in a receiver when a differential connection is broken.
Figure 3:
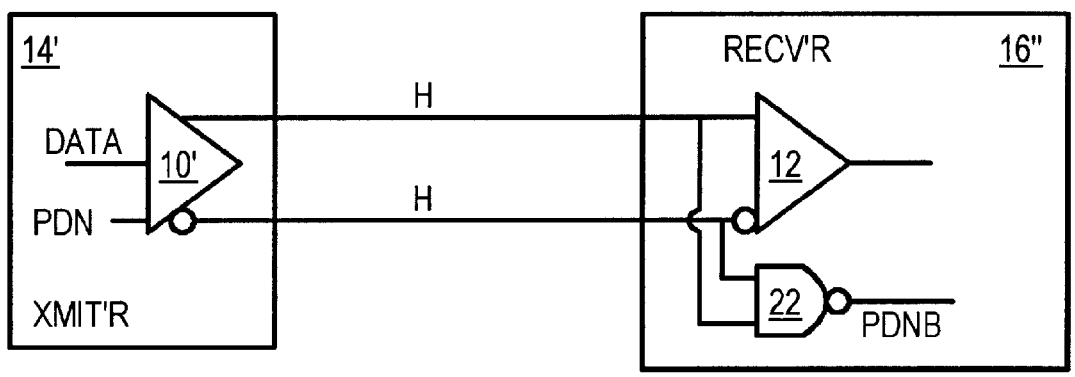
FIG. 3 shows a power-down mode encoded by an illegal high-high state of differential lines.
Figure 4A:
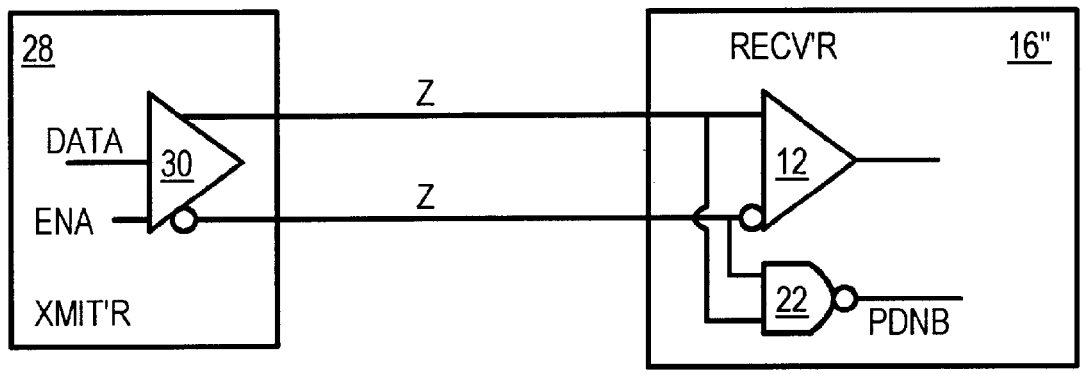
FIG. 4A shows a standard differential transmitter with an enable.
Figure 4B:
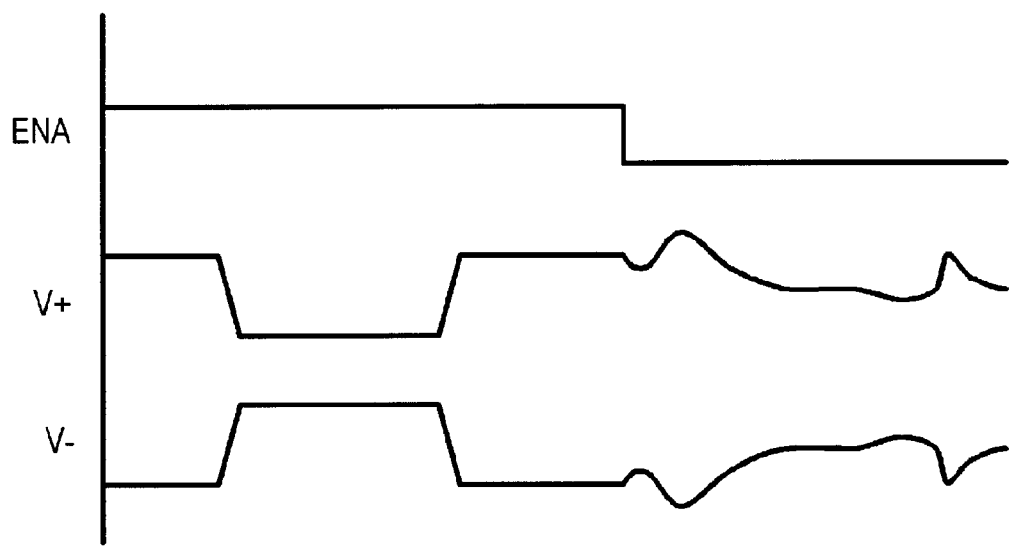
FIG. 4B is a waveform of a standard differential transmitter entering the high-Z state.
Figure 5A:
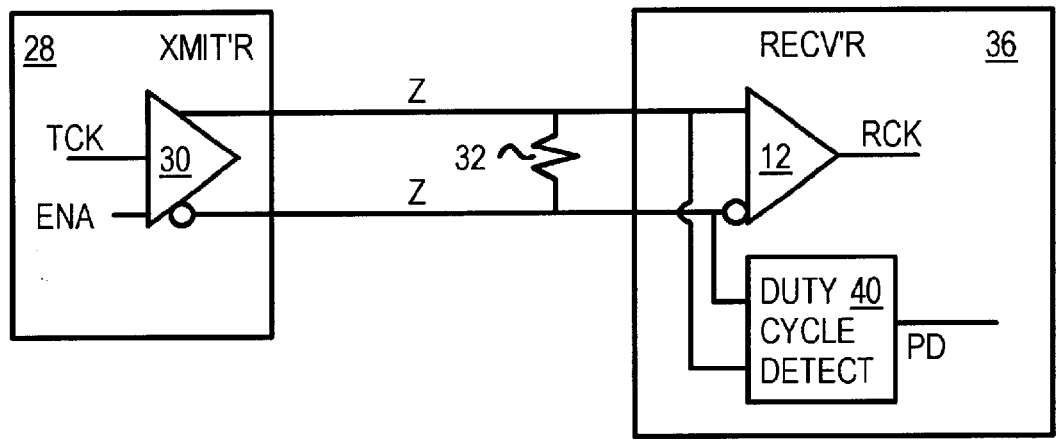
FIG. 5A shows detection of a high-impedance state of a standard differential transmitter to signal a power-down condition in the receiver.

FIG. 5A shows detection of a high-impedance state of a standard differential transmitter to signal a power-down condition in the receiver. Standard transmitter chip 28 includes differential driver or transmitter 30 that drives a clock onto a differential pair of lines between chips 28, 36. One differential line is driven with true clock CK+ and the other differential line with the inverse or complement of the clock CK−. When the enable signal ENA is driven low, differential transmitter 30 is disabled and no longer drives the differential lines. A high-impedance state (Z) is entered on both differential lines.

Differential receiver 12 in receiver chip 36 receives the pair of differential lines and senses a voltage difference. The voltage difference can be amplified and used to drive internal clock signal RCK in receiver chip 36.

Shunt resistor 32 can be a 120-Ohm or other value resistor between the pair of differential clock lines. The resistance value is sufficiently large to allow differential transmitter 30 to drive the differential clock lines sufficiently high and low so that differential receiver 12 can sense a voltage difference. A weak differential driver may require a larger resistance value such as 1K-Ohm or more.

When differential transmitter 30 is disabled, the differential clock lines float. One differential clock line may be at the high voltage while the other is at the low voltage when differential transmitter 39 is first disabled, but shunt resistor 32 eventually equalizes the voltages so that both differential clock lines have the same voltage. Envelope detector 40 then detects that the differential clock lines are at the common-mode voltage for most of the time and activates power-down signal PD. Signal PD can then power-down circuits in receiver chip 36.

Figure 5B:
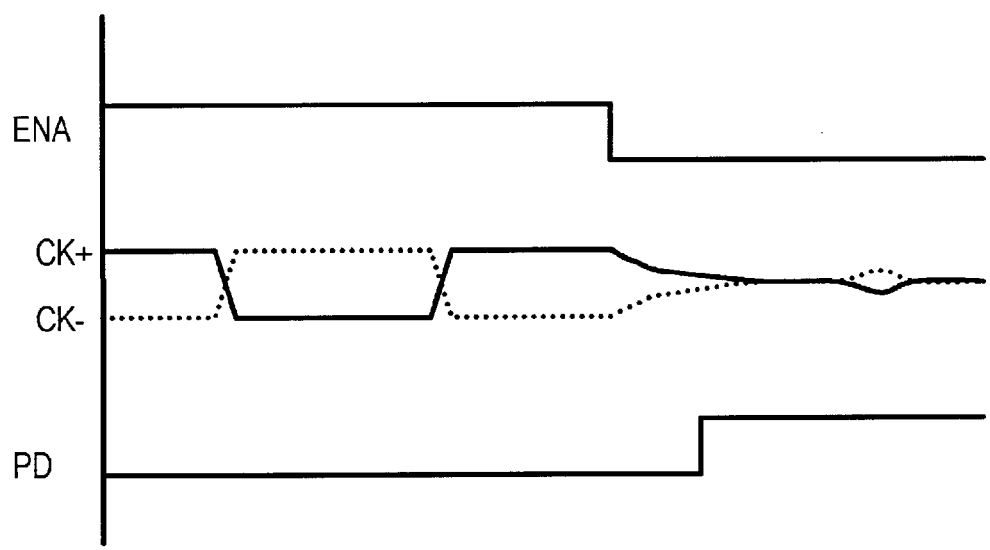
FIG. 5B is a waveform showing detection of the averaged peak voltage difference, or envelope, on differential clock lines.

FIG. 5B is a waveform showing detection of the envelope on differential clock lines. When enable ENA is active, the differential transmitter periodically drives differential clock lines CK+, CK− to opposite states to signal clock changes. As long as the amplitude of the differential signals is above the threshold of the detector circuit, the circuit can detect the existence of the input signal, regardless of the frequency.

When enable ENA goes low, the differential driver is disabled and enters a high-impedance state. The differential clock lines float. The shunt resistor between the differential clock lines causes the voltages to be equalized over time. Any disturbance to one line may cause a temporary voltage difference that is later re-equalized through the shunt resistor. Envelope detector 40 detects when the differential clock lines CK+, CK− are at the same common-mode voltage and drives the power-down signal PD high to activate the power-down state.

Figure 6:
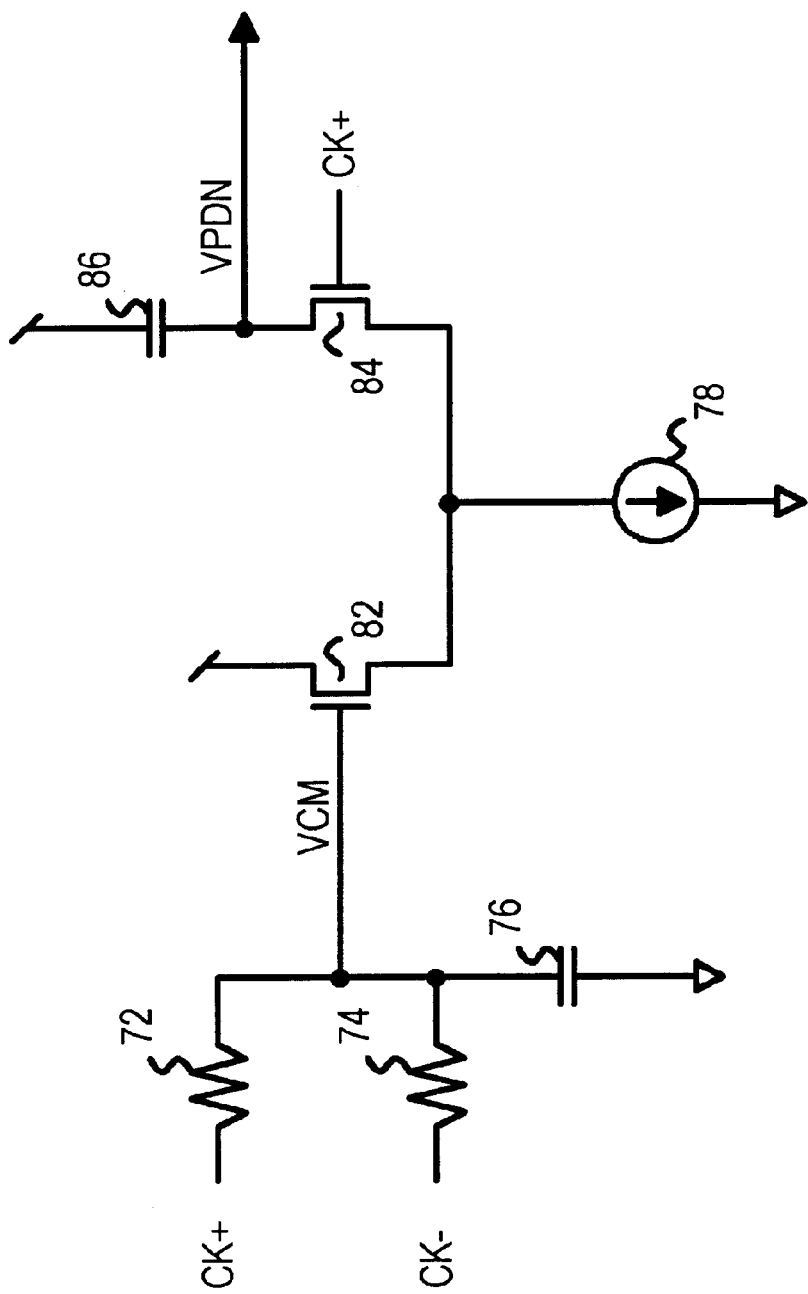
FIG. 6 is a simplified differential-clock-detector circuit.

FIG. 6 is a simplified differential-clock-detector circuit. This circuit is intended to detect the envelope of a clock rather than simply detect equal differential voltages, or edges of input pulses. Resistors 72, 74 have equal resistance values and are in series between differential clock inputs CK+, CK−. The middle node between resistors 72, 74 is a voltage halfway between the voltages of CK+, CK−, known as the common-mode voltage, VCM. Capacitor 76 smoothes out or averages the common-mode voltage VCM over time.

Capacitor 76 should have a sufficiently large capacitance value to store charge for at least one or more clock cycles.

The common-mode voltage VCM is applied to the gate of n-channel differential transistor 82, while differential clock line CK+ is applied to the gate of n-channel differential transistor 84. The sources of differential transistors 82, 84 are connected together and to current source 78 which sinks the tail current to ground.

Capacitor 86 is initially charged high so that output VPDN is high. A weak current source (not shown) between power and VPDN can initially charge VPDN high. During each part of the clock period when differential clock input CK+ rises above the common-mode voltage VCM, differential transistor 84 turns on and discharges capacitor 86 so that node VPDN goes lower in voltage.

When the clock is off in the high-impedance state, the voltage of differential clock line CK+ matches the common-mode voltage VCM. Then differential transistor 84 does not turn on, allowing capacitor 86 and node VPDN to be charged high. The high state of VPDN signals a loss of clock, while a low state signals the presence of the clock.

This simplified embodiment of envelope detector 40' may have other components added, such as current sources above differential transistors 82, 84. This circuit is useful for detecting clock loss when both clock lines enter a high-impedance state.

However, sometimes the differential clock may fail and not be in the high-impedance state. For example, the clock may stop pulsing and be in either the high-low or the low-high condition, rather than having both differential lines at the common-mode voltage.

The detector of FIG. 6 does not detect this condition, only the high-impedance state when both differential lines are at the common-mode voltage. For example, when the differential clock stops pulsing, with CK+ high and CK− low, differential transistor 84 remains on since CK+ is above VCM. Capacitor 86 and line VPDN are discharged low through differential transistor 84. The low VPDN erroneously signals that the clock is present when it has stopped in the high state. If the clock stops in the low state, VPDN is high, correctly signaling the clock loss.

Figure 7:
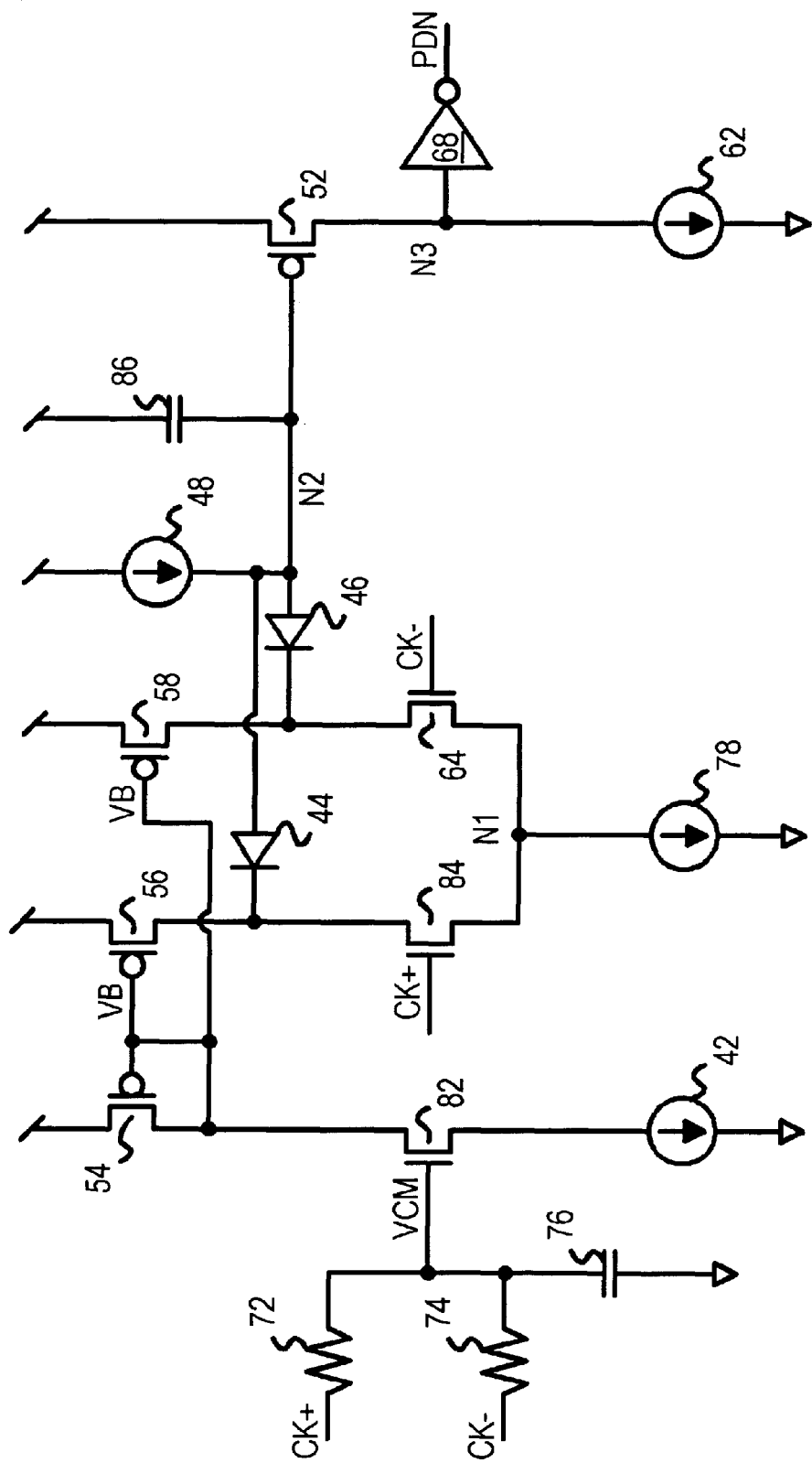
FIG. 7 is a differential-clock envelope detector circuit.

FIG. 7 is a differential-clock envelope detector circuit. This circuit detects when the clock fails and both differential lines are at the same common-mode voltage, or when the clock stops but one differential line is driven high and the other differential line is driven low. The principal of operation is similar to that of the simplified circuit of FIG. 6, where capacitor 86 is discharged low as the differential clock lines rise above the common-mode voltage VCM.

Resistors 72, 74 have equal resistance values and are in series between differential clock inputs CK+, CK−. The middle node between resistors 72, 74 is a voltage halfway between the voltages of CK+, CK−, known as the common-mode voltage, VCM. Capacitor 76 smoothes out or averages the common-mode voltage VCM over time. Capacitor 76 should have a sufficiently large capacitance value to store charge for at least one or more clock cycles.

Common-mode voltage VCM is applied to the gate of n-channel transistor 82, which sets a current drawn from p-channel bias transistor 54 and sunk through current sink 42. The gate and drain of p-channel bias transistor 54 are connected together as bias voltage VB. This bias voltage VB is mirrored to the gates of p-channel mirror transistors 56, 58, setting mirror currents to the drains of differential transistors 84, 64, respectively. The sources of n-channel differential transistors 84, 64 are connected together as node N1 and to current source 78 to ground.

Differential clock line CK+ is applied to the gate of n-channel differential transistor 84, while differential clock line CK− is applied to the gate of n-channel differential transistor 64. During the part of the clock cycle when CK+ is high, above VCM, differential transistor 84 turns on more strongly, pulling charge off of capacitor 86 and node N2 through diode 44. During the other part of the clock cycle when CK− is high, above VCM, differential transistor 64 turns on more strongly, also pulling charge off of capacitor 86 and node N2 through diode 46. Thus capacitor 86 is discharged low during both phases of the differential clock cycle, when either CK+ or CK− is high.

Diodes 44, 46 prevent re-charging of capacitor 86 during other parts of the differential clock cycle. Diodes 44, 46 can also provide a voltage shift to node N2. Current source 48 charges capacitor 86 high so that both plates of capacitor 86 have a high voltage when the differential clock is not pulsing or is in the high-impedance state. Current source 48 has a weaker current than the current drawn through diodes 44, 46 when the differential clock is pulsing.

Capacitor 86 integrates the voltages of the differential clock over time, detecting the averaged peak voltage or envelope of the differential clock rather than examining momentary voltages of the differential clock. Since each differential clock line is applied to only one transistor gate, input capacitive loading is light, ideal for higher-frequency operation than a clock-detector that applied the differential lines to several transistor gates, or a high-current circuit that uses large transistor gates for high-current-drive circuits.

Node N2, the bottom plate of capacitor 86, is applied to the gate of p-channel transistor 52, which has its drain connected to current sink 62 to invert N2 to drive node N3. Node N3 is again inverted by inverter 68 to drive power-down signal PDN. When the clock is pulsing and capacitor 86 and node N2 are discharged low, signal PDN is low to signal an active clock. When the clock is not pulsing and capacitor 86 and node N2 are charged high by current source 48, then signal PDN is driven high to signal an inactive clock or a power-down condition.

Figure 8:
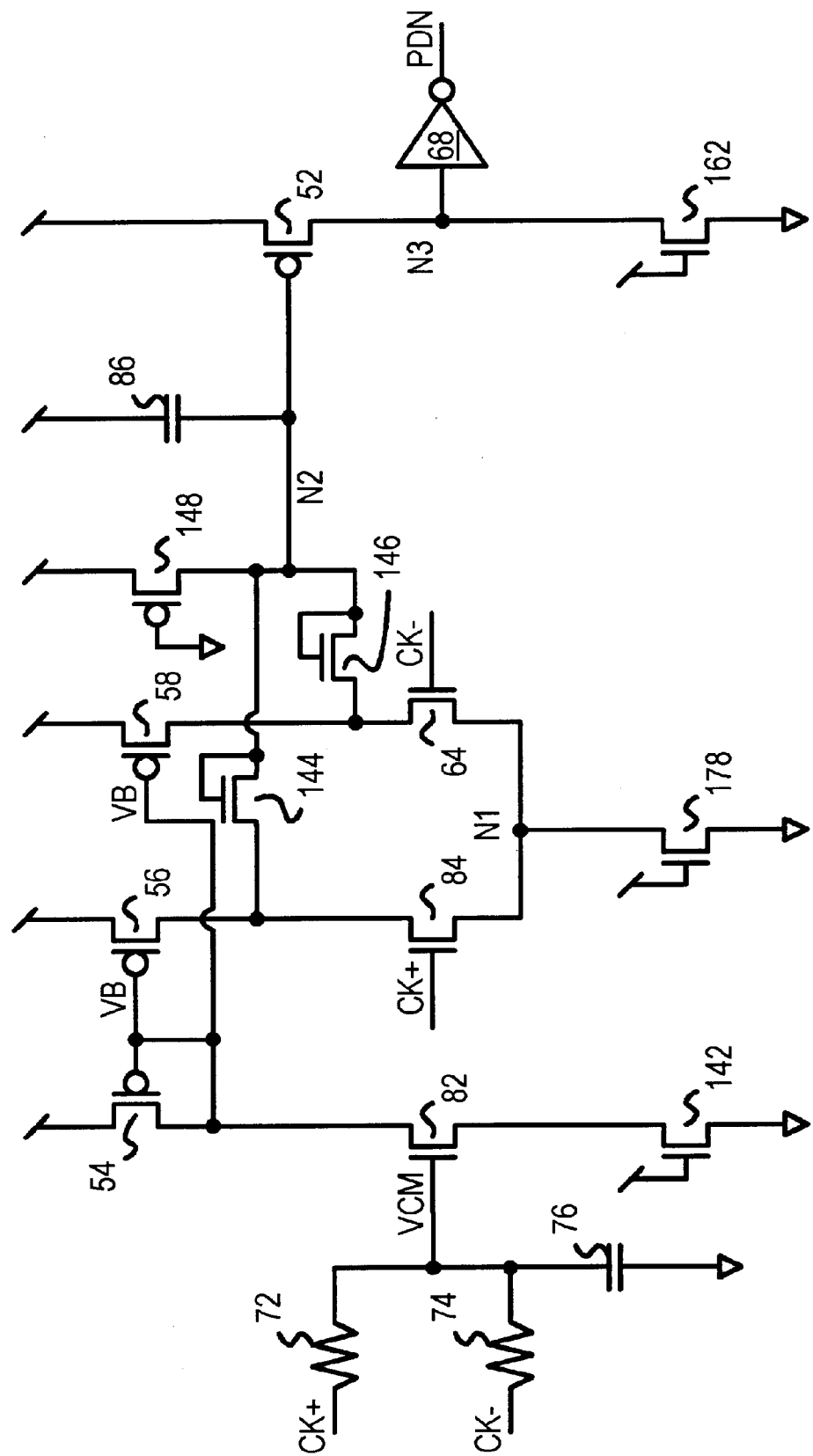
FIG. 8 is a more detailed schematic of a differential-clock envelope detector.

FIG. 8 is a more detailed schematic of a differential-clock envelope detector. Envelope detector 40 is similar to that shown in FIG. 7. Current sources 42, 78, 62 can be replaced with n-channel current-sink transistors 142, 178, 162. The gates of n-channel current-sink transistors 142, 178, 162 can be tied to power or to another bias voltage such as Vcc/2 or some other voltage. Power-down and reset logic could be combined with the bias voltages.

Current source 48 can be implemented as p-channel current-source transistor 148. The gate of transistor 148 can be tied to ground or to another bias voltage. Diodes 44, 46 can be implemented as n-channel transistors having their gates and drains connected together and to node N2.

ALTERNATE EMBODIMENTS

Several other embodiments are contemplated by the inventor. For example the shunt resistor between the CK+ and CK− line may not be present in some embodiments but not other embodiments. Resistor loads could replace transistor-based current sources and sinks. Negative current can reverse the meaning of sink and source.

Other devices such as additional gates, inverters, buffers, resistors, and capacitors can be added. Many other applications are possible, such as memory module power-down, powering down a network card, wireless subsystems, display systems, etc., in PC or other systems.

The power-down signal may be driven off the receiver chip to other chips such as memory chips on a memory module. The envelope detector could be integrated with the differential receiver and the circuits to be powered down, or it could be separate from either or both of the differential receiver and the powered-down circuits. The power-down signal may not be used for power-down purposes, but may be a clock-presence signal used by some other logic.

Signals can be active high or active low and can be inverted and logic re-arranged using DeMorgan's theorem. The detection circuits can be flipped over with n-channel and p-channel devices reversed. Other detectors could be substituted, and the ones described can be modified in a variety of ways. Pull-down or pull-up terminating resistors could be added to the differential lines.

The sizes of the differential transistors in the amplifiers can be varied to adjust activation of the power-down signal by adjusting currents in each amplifier leg. Transistors in each leg do not have to have the same sizes when some skew is desired. Capacitors can be implemented as transistors with the drain and source connected together as one capacitor terminal and the gate as the other capacitor terminal. Current sources and sinks can be implemented as n-channel or p-channel transistors with gates receiving a bias voltage.

The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. 37 C.F.R. §1.72(b). Any advantages and benefits described may not apply to all embodiments of the invention. When the word "means" is recited in a claim element, Applicant intends for the claim element to fall under 35 USC §112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word means are not intended to fall under 35 USC §112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A differential clock-presence detector comprising:
   a true differential clock line and a complement differential clock line alternately driven to opposite states when a differential clock is present and pulsing;
   an output capacitor coupled to an output node;
   a first differential transistor, having a gate receiving the true differential clock line, for drawing a first discharge current;
   a first mirror transistor, coupled to the first differential transistor, for generating a first mirror current in response to a bias voltage applied to a gate of the first mirror transistor;
   a second differential transistor, having a gate receiving the complement differential clock line, for drawing a second discharge current;
   a second mirror transistor, coupled to the second differential transistor, for generating a second mirror current in response to the bias voltage applied to a gate of the second mirror transistor;
   wherein pulsing of the differential clock draws the first and second currents from the output capacitor to drive the output node to a clock-present state; and
   a leaker for driving a leakage current to the output node, the leakage current being less than the first discharge current,
   wherein loss of the differential clock causes the leakage current to drive the output node to a clock-loss state,
   whereby presence of the differential clock is detected.

2. The differential clock-presence detector of claim 1 further comprising:
   a first diode, coupled between the first differential transistor and the output capacitor; and
   a second diode, coupled between the second differential transistor and the output capacitor.

3. The differential clock-presence detector of claim 2 further comprising:
   a current sink, coupled to the first and second differential transistors, for sinking a tail current from the first and second differential transistors.

4. The differential clock-presence detector of claim 3 wherein the first and second differential transistors are n-channel transistors having sources connected together and to the current sink;
   wherein the first and second mirror transistors are p-channel transistors having sources connected to a power supply;
   wherein drains of the first mirror transistor and the first differential transistor are connected together and to the first diode;
   wherein drains of the second mirror transistor and the second differential transistor are connected together and to the second diode.

5. The differential clock-presence detector of claim 4 wherein the first diode is a n-channel transistor having a gate and a drain connected together and to the output node;
   wherein the second diode is a n-channel transistor having a gate and a drain connected together and to the output node.

6. The differential clock-presence detector of claim 1 further comprising:
   a buffer, coupled to the output node, for buffering the output node to generate a clock-loss signal.

7. The differential clock-presence detector of claim 6 wherein the output capacitor is connected between the output node and a power supply;
   wherein the output capacitor and the output node are discharged low when the differential clock is pulsing, but rises high by the leakage current when the differential clock stops pulsing.

8. The differential-clock-presence detector of claim 1 further comprising:
   a first resistor, coupled between the true differential clock line and a common-mode node;
   a second resistor, coupled between the complement differential clock line and the common-mode node;
   a bias transistor that receives the common-mode node at a gate to generate a bias current in response to a common-mode voltage of the common-mode node; and a bias mirror transistor, coupled to the bias transistor and passing the bias current, for setting the bias voltage, whereby the bias voltage is set by the common-mode voltage.

9. The differential clock-presence detector of claim 8 further comprising:

a common-mode capacitor coupled to the common-mode node, whereby the common-mode voltage is averaged by the common-mode capacitor.

10. A differential clock detector comprising:

a first differential clock input and a second differential clock input that together form a differential clock input;

tail current means for drawing a tail current from a tail node;

integrating capacitor means for storing charge on an integrating node;

first differential transistor means, coupled between a first node and the tail node, for generating a first current in response to the first differential clock input;

first current source means, coupled to the first node, for sourcing current to the first differential transistor means;

first diode means, coupled between the first node and the integrating node, for drawing the first current from the integrating capacitor means when the differential clock input is pulsing;

second differential transistor means, coupled between a second node and the tail node, for generating a second current in response to the second differential clock input;

second current source means, coupled to the second node, for sourcing current to the second differential transistor means; and second diode means, coupled between the second node and the integrating node, for drawing the second current from the integrating capacitor means when the differential clock input is pulsing, whereby first and second currents are integrated by the integrating capacitor means to detect presence of pulsing of the differential clock input.

11. The differential clock detector of claim 10 further comprising:

buffer means for buffering the integrating node to generate a clock-loss signal; and leaker means, coupled to the integrating node, for providing a leakage current to the integrating capacitor means, the leakage current being offset by the first and second currents when the differential clock input is pulsing, but the leakage current causing the clock-loss signal to be driven to an active state when the differential clock input is not pulsing, whereby the clock-loss signal is activated to indicate loss of pulsing of the differential clock input.

12. The differential clock detector of claim 11 wherein the first current is drawn from the integrating capacitor means when the first differential clock input is high, while second current is drawn from the integrating capacitor means when the second differential clock input is high, whereby first and second currents are alternately drawn from the integrating capacitor means as the differential clock input is pulsing.

13. The differential clock detector of claim 12 further comprising:

common-mode means, coupled between the first and second differential clock inputs, for generating a common-mode voltage; and bias-generator means, receiving the common-mode voltage, for generating a bias voltage to the first and second current source means to control currents generated by the first and second current source means, whereby sourced currents are controlled by the common-mode voltage.

14. The differential clock detector of claim 13 wherein the first differential transistor means and the second differential transistor means are n-channel transistors, and wherein the integrating capacitor means is a capacitor between the integrating node and a power supply, and the first current source means and the second current source mans comprise p-channel transistors, or the first differential transistor means and the second differential transistor means are p-channel transistors, and the integrating capacitor means is a capacitor between the integrating node and a ground, and the first current source means and the second current source means comprise n-channel transistors.

15. A differential clock detect circuit comprising:

differential clock inputs that include a first differential clock line and a second differential clock line;

an output capacitor on an output node;

a first differential transistor with a gate that receives the first differential clock line, a drain coupled to a first node, and a source coupled to a source node;

a first current source transistor having a drain coupled to the first node and a gate driven by a bias node;

a first diode coupled between the first node and the output node, the first diode preventing backward current flow form the first current source transistor to the output node;

a second differential transistor with a gate that receives the second differential clock line, a drain coupled to a second node, and a source coupled to the source node;

a second current source transistor having a drain coupled to the second node and a gate driven by a bias node;

a second diode coupled between the second node and the output node, the second diode preventing backward current flow from the second current source transistor to the output node; and a buffer, receiving the output node, for driving a clock-loss signal that indicates when the differential clock inputs are not pulsing, whereby loss of differential clock pulsing is detected.

16. The differential clock detect circuit of claim 15 wherein the first and second differential transistors are n-channel transistors, and the first and second current source transistors are p-channel transistors, or the first and second differential transistors are p-channel transistors, and the first and second current source transistors are n-channel transistors.

17. The differential clock detect circuit of claim 16 further comprising:

a first resistor between the first differential clock line and a common node;

a second resistor between the second differential clock line and the common node;

a common-node capacitor on the common node;

a bias transistor receiving the common node at a gate, and having a drain connected to the bias node; and a bias mirror transistor having a gate and a drain connected together and to the bias node, whereby bias to the first and second current source transistors is generated from the common node between the first and second differential clock lines.

18. The differential clock detect circuit of claim 17 further comprising:

a leaker transistor having a drain connected to the output node, and a gate connected to a fixed voltage, the leaker transistor being a p-channel transistor having a source connected to a power supply when the first differential transistor is an n-channel transistor, but an n-channel transistor with a source connected to a ground when the first differential transistor is a p-channel transistor.

19. The differential clock detect circuit of claim 18 further comprising:

a current sink transistor coupled between the source node and a ground.

* * * * *